United States Patent [19]

Gugumus

[11] Patent Number: 5,021,485
[45] Date of Patent: Jun. 4, 1991

[54] LIGHT STABILIZER COMBINATION

[75] Inventor: Francois Gugumus, Allschwil, Switzerland

[73] Assignee: Ciba-Geigy Corporation, Ardsley, N.Y.

[21] Appl. No.: 390,321

[22] Filed: Aug. 7, 1989

Related U.S. Application Data

[63] Continuation-in-part of Ser. No. 172,881, Mar. 25, 1988, abandoned.

[30] Foreign Application Priority Data

Apr. 3, 1987 [CH] Switzerland .................. 1282/87

[51] Int. Cl.$^5$ ................. C08K 5/3492; C08K 5/3435; C09K 15/22
[52] U.S. Cl. .................................... 524/100; 524/102; 252/403
[58] Field of Search ................. 252/403; 524/100, 102

[56] References Cited

U.S. PATENT DOCUMENTS 4,692,486 9/1987 Gugumus ........................ 524/100

OTHER PUBLICATIONS

Gächter, Müller/Taschenbuch der Kunstoff–Additive (Handbook of Plastics Additives), 2nd Ed., (1983), pp. 144–198.
Chem. Abst. 89, 181157n (1978).

Primary Examiner—Kriellion Morgan
Attorney, Agent, or Firm—JoAnn Villamizar

[57] ABSTRACT

Synergistic light stabilizer combinations comprising (a) a compound of formula I

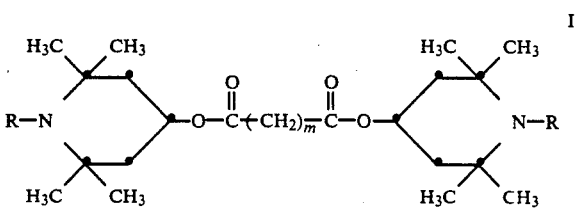

wherein m is 2 or 3 and R is hydrogen, $C_1$–$C_4$alkyl, 2-hydroxyethyl, 2-hydroxypropyl, allyl, benzyl, acetyl or acryloyl, and (B) a compound which contains at least one group of formula II

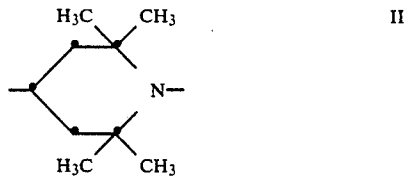

and has a molecular weight higher than 700, are most suitable for stabilizing organic polymers, especially polyolefins.

31 Claims, No Drawings

LIGHT STABILIZER COMBINATION

This is a continuation-in-part of U.S. application Ser. No. 172,881, filed Mar. 25, 1988 now abandoned.

The present invention relates to combinations of specific low molecular and high molecular polyalkylpiperidines and to the use thereof as stabilisers for organic polymers, as well to the polymers stabilised therewith.

Polyalkylpiperidines, in particular 2,2,6,6-tetramethylpiperidines, are known light stabilisers. They have wide utility for stabilising organic materials, especially plastics and lacquers. A distinction is normally made between two classes of polyalkylpiperidines, namely low molecular compounds (having a molecular weight of up to about 500) and high molecular compounds (having a molecular weight above 700). A typical representative of the low molecular polyalkylpiperidines is bis-2,2,6,6-tetramethylpiperidylsebácate (Tinuvin® 770). Typical representatives of high molecular polyalkylpiperidines are polyesters, polyamines or polyaminotriazines, e.g. the commercially available products Tinuvin® 622 and Chimassorb® 944. A description of the individual types and their performance properties will be found in Gächter, Müller/Taschenbuch der Kunststoff-Additive (Handbook of Plastics' Additives), 2nd edition, 1983, C. Hanser-Verlag, pp. 144–198.

Mixtures of low molecular and high molecular polyalkylpiperidines, for example mixtures of Tinuvin® 770 with Chimassorb® 944 or with Tinuvin® 622, have previously been disclosed in EP-A-80431. Novel specific combinations of low molecular and high molecular polyalkylpiperidines have now been found, which combinations are distinguished by particularly advantageous properties.

Specifically, the invention relates to light stabiliser combinations comprising (A) at least one compound of formula I

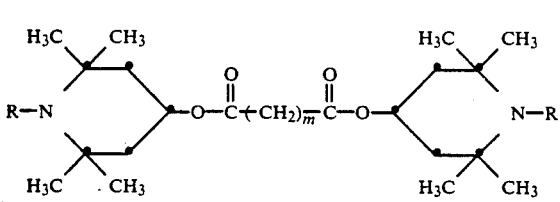

wherein m is 2 or 3 and R is hydrogen, $C_1$–$C_4$ alkyl, 2-hydroxyethyl, 2-hydroxypropyl, allyl, benzyl, acetyl or acryloyl, and (B) at least one compound which contains at least one group of formula II

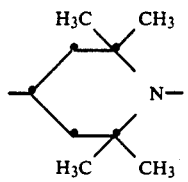

and has a molecular weight higher than 700.

The compounds of formula I are succinates and glutarates of 4-hydroxy-2,2,6,6-tetramethylpiperidines. The compounds in which m is 2 are preferred, i.e. the succinates.

Also preferred are the compounds of formula I, wherein R is hydrogen or methyl. These compounds comprise:
di-(2,2,6,6-tetramethyl-4-piperidyl)succinate
di-(2,2,6,6-tetramethyl-4-piperidyl)glutarate
di-(1,2,2,6,6-pentamethyl-4-piperidyl)succinate and
di-(1,2,2,6,6-pentamethyl-4-piperidyl)glutarate.

The high molecular light stabilisers (B) comprise polyesters of formula III

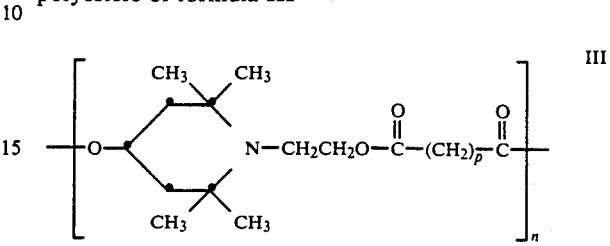

wherein n is an integer from 4 to 20 and p is an integer from 2 to 8, preferably polyesters of formula III, wherein p is 2.

The high molecular light stabilisers (B) also comprise polytriazine compounds which contain groups of formula IIa

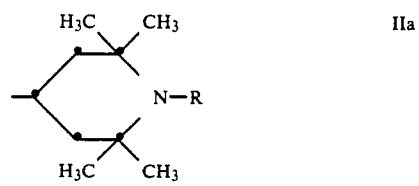

Among this group of compounds, those compounds are preferred in which R is hydrogen or methyl.

The following important classes of light stabilisers come into the catgory of these polytriazine compounds:

(a) compounds of formula IV

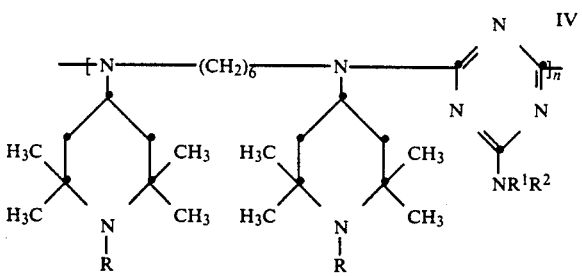

wherein n is an integer from 4 to 20 and $R^1$ and $R^2$ are each independently of the other hydrogen, $C_1$–$C_{12}$ alkyl, $C_2$–$C_4$ hydroxyalkyl or $C_3$–$C_{10}$ alkoxy-alkyl, or $R^1$ and $R^2$, together with the nitrogen atom to which they are attached, form a pyrrolidine, piperidine, morpholine or piperazine ring.

Exemplary of such compounds is the compound of formula IV, wherein $R^1$ is hydrogen and $R^2$ is 1,1,3,3-tetramethylbutyl, or wherein the $-NR^1R^2$ group is a morpholino group.

(b) Compounds of formula V

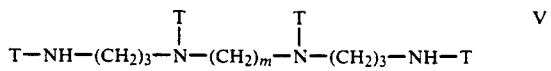

wherein m is an integer from 2 to 8 and T is a group of formula VI

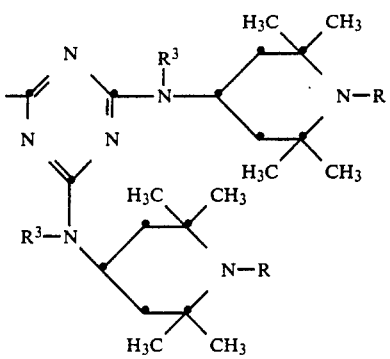

wherein $R^3$ is $C_1$–$C_{12}$ alkyl, $C_2$–$C_4$ hydroxyalkyl or $C_3$–$C_{10}$ alkoxyalkyl, and R is as defined above.

Examples of such compounds are the compounds of formula V, wherein m is 2, $R^3$ butyl and R is hydrogen or methyl.

(c) Compounds of formula VII

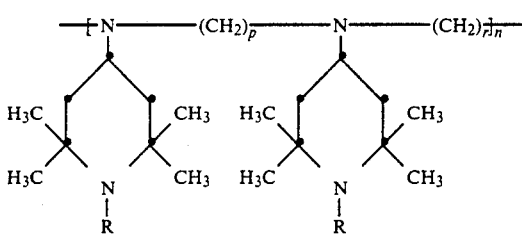

wherein p and r are each independently of the other 2 to 8, n is 4 to 20 and R is as defined above.

Exemplary of such compounds is the compound of formula VII, wherein p is 6 and r is 2.

(d) Compounds of formula VIII

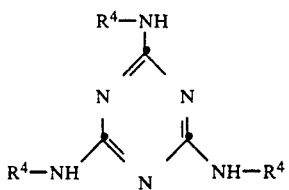

wherein $R^4$ is a group of formula VI.

Examples of such compounds are compounds of formula VIII, wherein $R^3$ is butyl and R is hydrogen or methyl.

The compounds (A) and (B) are known light stabilisers and can be prepared by known methods.

The combinations of this invention are, however, superior to the individual components (A) and (B) in their light stabilising action. The ratio of (A):(B) in the combinations can vary within wide ranges, preferably from 10:1 to 1:10. The synergism is particularly evident in the range from 5:1 to 1:5, especially in the range from 2:1 to 1:2.

Compounds (A) and (B) can be added to the material to be stabilised singly or in admixture. The total concentration of (A) +(B) in the polymer is thus usually from 0.02 to 5 % by weight, preferably from 0.05 to 1.5 % by weight. The light stabilisers can also be added to the polymer in the form of a masterbatch which contains these compounds in a combination of 2.5 to 25 % by weight.

The combinations of this invention can be used for stabilising organic polymers, in particular against light-induced degradation. Examples of such polymers are the following classes:

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbornene, polyethylene (which can be uncrosslinked or crosslinked), for example high density polyethylene (HDPE), low density polyethylene (LDPE and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE) or mixtures of polypropylene with ethylene/ propylene/diene terpolymers.

3. Copolymers of monoolefins and diolefins with each other or with other vinyl monomers, such as, for example, ethylene/propylene copolymers linear low density polyethylene (LLDPE) and mixtures thereof with low density polyethylene (LDPE), propylene/but-1-ene copolymers, ethylene/ hexene copolymers, ethylene/-methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and their salts (ionomers), as well as terpolymers of ethylene with propylene and a diene such as hexadiene, dicyclopentadiene or ethylidenenorbornene; and also mixtures of such copolymers with each other and with polymers mentioned in 1) above, for example polypropylene/ethylene-propylenecopolymers, LDPE/EVA, LDPE/EAA, LLDPE/EVA and LLDPE/EAA.

3a. Hydrocarbon resins (for example $C_5$–$C_9$), including hydrogenated modifications thereof (for example tackifiers).

4. Polystyrene, poly-(p-methylstyrene), poly-(α-methylstyrene).

5. Copolymers of styrene or α-methylstyrene with dienes or acrylic derivatives, for example styrene/-butadiene, styrene/acrylonitrile, styrene/alkylmethacrylate, styrene/butadiene/alkylacrylate, styrene/ maleic anhydride, styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/ styrene, styrene/isoprene/styrene, styrene/ethylene/butylene/ styrene or styrene/ethylene/propylene/styrene.

6. Graft copolymers of styrene or α-methylstyrene, for example styrene on polybutadiene, styrene on polybutadiene/styrene or polybutadiene/ acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/- propylene/diene terpolymers, styrene and acrylonitrile on polyacrylates or polymethacrylates, styrene and acrylonitrile on acrylate/butadiene copolymers, as well as mixtures thereof with the copolymers listed under 5), for example the copolymer mixtures known as ABS, MBS, ASA or AES polymers.

7. Halogenated polymers such as polychloroprene, chlorinated rubbers, chlorinated or sulfochlorinated polyethylene, epichlorohydrin homo- and copolymers, polymers of halogenated vinyl compounds, for example polyvinylchloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from $\alpha,\beta$-unsaturated acids and derivatives thereof, such as polyacrylates and polymethacrylates, polyacrylamides and polyacrylonitriles.

9. Copolymers of the monomers mentioned under 8) with each other or with other unsaturated monomers, for example acrylonitrile/butadiene copolymers, acrylonitrile/alkylacrylate copolymers, acrylonitrile/alkoxyalkylacrylate or acrylonitrile/vinyl halide copolymers or acrylonitrile/alkylmethacrylate/butadiene terpolymers.

10. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinylbutyrate, polyallyl phthalate or polyallylmelamine; as well as their copolymers with the olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with polystyrene or polyamides.

14. Polyurethanes which are derived from polyethers, polyesters or polybutadienes with terminal hydroxyl groups on the one hand and aliphatic or aromatic polyisocyanates on the other side, as well as precursors thereof.

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylene diamine and isophthalic and/or terephthalic acid and optionally an elastomer as modifier, for example poly-2,4,4,-trimethylhexamethylene terephthalamide or poly-m-phenylene isophthalamide. Further copolymers of the aforementioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS, and polyamides condensed during processing (RIM polyamide systems).

16. Polyureas, polyimides and polyamide-imides and polybenzimidazoles.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, polyhydroxybenzoates as well as block-copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20 Crosslinked polymers which are derived from aldehydes on the one hand and phenols, ureas and melamines on the other hand, such as phenol/ formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Crosslinkable acrylic resins derived from substituted acrylic esters, such as epoxyacrylates, urethaneacrylates or polyesteracrylates.

24. Alkyd resins, polyester resins or acrylate resins which are crosslinked with melamine resins, urea resins, polyisocyanates or epoxy resins.

25. Crosslinked epoxy resins which are derived from polyepoxides, for example from bisglycidyl ethers or from cycloaliphatic diepoxides.

26. Natural polymers such as cellulose, rubber, gelatine and chemically modified homologous derivatives thereof such as cellulose acetates, cellulose propionates and cellulose butyrates, or the cellulose ethers, such as methylcellulose; rosins and their derivatives.

The synergism occurs especially clearly in polyolefins and their copolymers and mixtures, in particular in polypropylene.

The addition of the stabiliser combination can be made before, during or after the preparation of the polymers, preferably by blending it with the polymer before or during the fabrication of shaped articles made therefrom by methods conventionally employed in the art.

Other stabilisers or additives customarily employed in plastics technology can also be added simultaneously. Examples of such additional stabilisers and additives are:

1. Antioxidants

1 Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tertbutyl -4-methylphenol), 2,2'-thiobis(4- octylphenol), 4,4′-thiobis(6-tertbutyl -3-methylphenol), 4,4′-thiobis(6-tert-butyl-2-methylphenol).

1.4. Alkylidenebisphenols, for example 2,2′-methylenebis(6-tert-butyl-4-methylphenol), 2,2′-methylenebis(6-tert-butyl-4-ethylphenol), 2,2′-methylenebis [4-methyl-6-(α-methylcyclohexyl)phenol], 2,2′-methylenebis-4-methyl-6-cyclohexylphenol), 2,2′-methylenebis(6-nonyl-4-methylphenol), 2,2′-methylenebis(4,6-di-tert-butylphenol), 2,2′-ethylidenebis(4,6-di-tert-butylphenol), 2,2′-ethylidenebis(6-tert-butyl-4-isobutylphenol), 2,2′-methylenebis[6-(α-methylbenzyl)-4-nonylphenol], 2,2′-methylenebis[6-(α,α-dimethylbenzyl)-4-nonylphenol], 4,4′-methylenebis(2,6-di-tert-butylphenol), 4,4′-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl phenyl)-3-n-dodecylmercaptobutane, ethylene glycol bis[3,3-bis(3′-tert-butyl-4′ -hydroxyphenyl)butyrate], bis(3-tert-butyl-4hydroxy-5methylphenyl) dicyclopentadiene, bis[2-(3′-tert-butyl-2′-hydroxy-5-methbenzyl)-6-tert-butyl-4methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

1.6. Acylaminophenols, for example 4-hydroxylauranilide, 4-hydroxystearanilide, 2,4-bis(octylmercapto)-6-(3,5-di-tert-butyl-4-hydroxyanilino) s-triazine, octyl N-(3,5-di-tert-butyl-4-hydroxyphenyl)carbamate.

1.7. Esters of β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N′-bis(hydroxyethyl)oxalyl diamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N′-bis(hydroxyethyl)oxalyl diamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N′-bis(hydroxyethyl)oxalyl diamide.

1.10. Amides of β-(3,5-di-tert-butyl-4-hydroxyphenyl)propionic acid e.g. N,N′-bis(3,5-di-tert-butyl-4-hydroxyphenylpropionyl)hexamethylene-diamine, N,N′-bis(3,5-di-tert-butyl-4-hydroxyphenylpropionyl)-trimethylenediamine, N,N′-bis(3,5-di-tert-butyl-4-hydroxyphenylpropionyl)hydrazine.

2. UV absorbers and light stabilisers 2.1. 2-(2′-Hydroxyphenyl)benzotriazoles, for example the 5′-methyl, 3′,5′-di-tert-butyl, 5′-tert-butyl, 5′-(1,1,3,3-tetramethylbutyl), 5- chloro-3′,5′-di-tert-butyl, 5chloro-3′-tert-butyl-5′methyl, 3′-sec-butyl-5′-tert-butyl, 4′-octoxy, 3′, 5′-di-tert-amyl and 3′, 5′-bis(α, α-dimethylbenzyl) derivatives.

2.2 2-Hydroxybenzophenones, for example the 4-hydroxy, 4-methoxy, 4-octoxy, 4-decyloxy, 4-dodecyloxy, 4-benzyloxy, 4,2′, 4′-trihydroxy and 2′-hydroxy-4,4′-dimethoxy derivatives.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2′-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Oxalyl diamides, for example 4,4′-dioctyloxyoxanilide, 2,2′-dioctyloxy-5,5′-di-tert-butoxanilide, 2,2′-didodecyloxy-5,5′-di-tert-butoxanilide, 2-ethoxy-2′-ethyloxanilide, N,N′-bis(3-dimethylaminopropyl)oxalamide, 2-ethoxy-5-tert-butyl-2′-ethyloxanilide and its mixture with 2-ethoxy-2′-ethyl-5,4′-di-tert-butoxanilide and mixtures of ortho- and para-methoxy-disubstituted oxanilides and mixtures of o- and p-ethoxy-disubstituted oxanilides.

3. Metal deactivators for example N,N′-diphenyloxalyl diamide, N-salicylal-N′-salicyloylhydrazine, N,N′-bis(salicyloyl)hydrazine, N,N′-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl) pentaerythritol diphosphite, tristearyl sorbitol triphosphite, tetrakis(2,4-di-tert-butylphenyl) 4,4′-biphenylene diphosphonite, 3,9-bis(2,4-di-tert-butylphenoxy)-2,4,8,10-tetraoxa-3,9-diphosphaspiro[5.5]undecane.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in conjunction with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium stearate, sodium ricinoleate and potassium palmitate, antimony pyrocatecholate or zinc pyrocatecholate 8. Nucleating agents, for example, 4-tert-butylbenzoic acid, adipic acid, diphenylacetic acid.

9. Fillers and reinforcing agents, for example calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, fluorescent whitening agents, flameproofing agents, antistatic agents and blowing agents.

The following Examples illustrate stabiliser combinations of this invention and the use thereof. Parts and percentages are by weight, unless otherwise stated.

EXAMPLE

Stabilisation of polypropylene injection moulded sheets 100 parts of polypropylene powder [melt index 2.4 g/10 min (230° C./2160 g)]are mixed in a drum mixer with 0.05 part of pentaerythrityl tetrakis[8-(3,5-di-tert-butyl-4-hydroxyphenyl)propionate], 0.05 part of tris(2,4-di-tert-butylphenyl)phosphite, 0.1 part of calcium stearate, 0.25 part of phthalocyanine blue and 0.1 part of light stabiliser, and the mixture is thereafter granulated in an extruder at a temperature of 200°-220° C. The resultant granulate is injection moulded in an injection moulder at 250°-260° C. to small sheets of 2 mm thickness.

The polypropylene sheets so obtained are irradiated in a Ci65 Weather-O-Meter at a black panel temperature of 63°±3° C. (ASTM G 26-77). The samples are examined visually at regular intervals for chalking. The exposure time until incipient chalking is taken as reference for the protective action of the individual light stabilisers. The results are reported in Table 1.

The following light stabilisers are used:
LS-1=di-(2,2,6,6-tetramethyl-4-piperidyl) succinate
LS-2=polyaminotriazine of formula (A) at least one compound of formula I

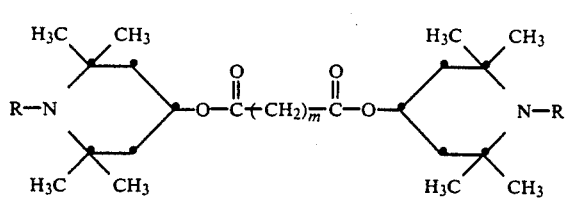

wherein m is 2 or 3 and R is hydrogen $C_1$-$C_4$ alkyl, 2-hydroxyethyl, 2-hydroxypropyl, allyl, benzyl, acetyl or acryloyl, and (B) a polyester of formula III

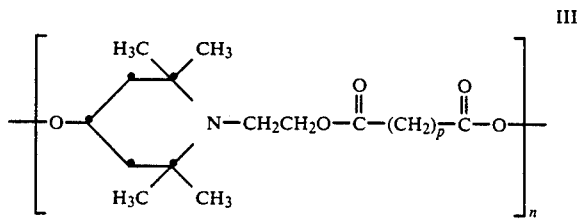

wherein n is an integer from 4 to 20, p is an integer from 2 to 8 and having a molecular weight higher than 700.

2. A combination according to claim 1, wherein (A) is a compound of formula I in which m is 2.

3. A combination according to claim 1, wherein (A) is a compound of formula I in which R is hydrogen or methyl.

4. A combination according to claim 1, wherein (B) is a polyester of formula III in which p is 2.

5. A combination according to claim 1, wherein the ratio of (A):(B) is from 10:1 to 1:10.

6. A combination according to claim 1, wherein the ratio of (A):(B) is from 2:1 to 1:2.

7. A light stabilizer combination comprising
(A) at least one compound of formula I

TABLE 1

| Light stabiliser | Eposure time until incipient chalking |
|---|---|
| none | 610 h |
| 0.05% LS-1 + 0.05% LS-2 | >800 h |

What is claimed is:
1. A light stabilizer combination comprising

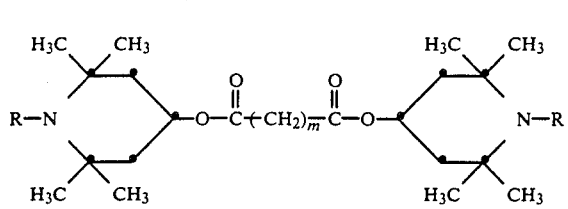

wherein m is 2 or 3 and R is hydrogen, $C_1$–$C_4$ alkyl, 2-hydroxyethyl, 2-hydroxypropyl, allyl, benzyl, acetyl or acryloyl, and (B) a compound of formula IV

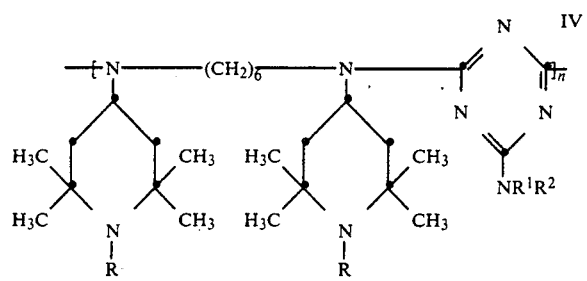

wherein n is an integer from 4 to 20 and $R^1$ and $R^2$ are each independently of the other hydrogen, $C_1$–$C_{12}$ alkyl, $C_2$–$C_4$ hydroxyalkyl or $C_3$–$C_{10}$ alkoxyalkyl, or $R^1$ and $R_2$, together with the nitrogen atom to which they are attached, form a pyrrolidine, piperidine, morpholine or piperazine ring and having a molecular weight higher than 700.

8. A combination according to claim 7, wherein (A) is a compound of formula I in which m is 2.

9. A combination according to claim 7, wherein (A) is a compound of formula I in which R is hydrogen or methyl.

10. A combination according to claim 7, wherein the ratio of (A):(B) is from 10:1 to 1:10.

11. A combination according to claim 7, wherein the ratio of (A):(B) is from 2:1 to 1:2.

12. A light stabilizer combination comprising
(A) at least one compound of formula I

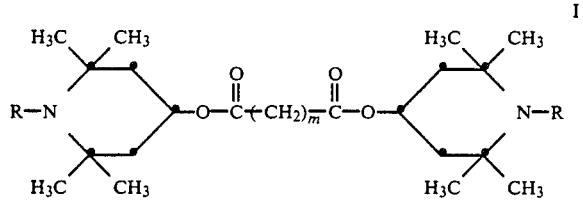

wherein m is 2 or 3 and R is hydrogen $C_1$–$C_4$ alkyl, 2-hydroxyethyl, 2-hydroxypropyl, allyl, benzyl, acetyl or acryloyl, and (B) a compound of formula V

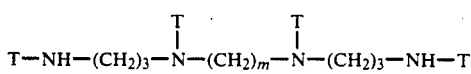

wherein m is an integer from 2 to 8 and T is a group of formula VI

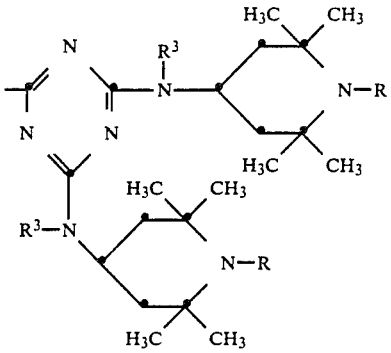

wherein $R^3$ is $C_1$–$C_{12}$ alkyl, $C_2$–$C_4$ hydroxyalkyl or $C_3$–$C_{10}$ alkoxyalkyl, and R is hydrogen, $C_1$–$C_4$ alkyl, 2-hydroxyethyl, 2-hydroxypropyl, allyl, benzyl, acetyl or acryloyl and having a molecular weight higher than 700.

13. A combination according to claim 12, wherein (A) is a compound of formula I in which m is 2.

14. A combination according to claim 12, wherein (A) is a compound of formula I in which R is hydrogen or methyl.

15. A combination according to claim 12, wherein the ratio of (A):(B) is from 10:1 to 1:10.

16. A combination according to claim 12, wherein the ratio of (A):(B) is from 2:1 to 1:2.

17. A light stabilizer combination comprising (A) at least one compound of formula I

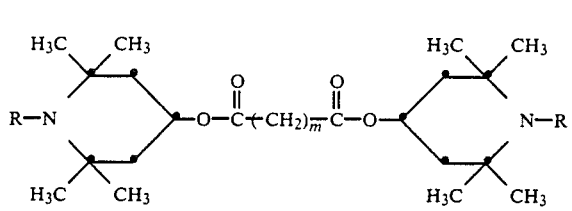

m or 3 and R is hydrogen $C_1$–$C_4$ alkyl, 2-hydroxyethyl, 2-hydroxypropyl, allyl, benzyl, acetyl or acryloyl, and (B) a compound of formula VII

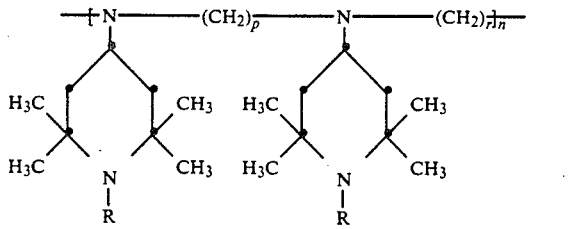

wherein p and r are each independently of the other 2 to 8, n is 4 to 20 and R is hydrogen, $C_1$–$C_4$ alkyl, 2-hydroxyethyl, 2-hydroxypropyl, allyl, benzyl, acetyl or acryloyl and having a molecular weight higher than 700.

18. A combination according to claim 17, wherein (A) is a compound of formula I in which m is 2.

19. A combination according to claim 17, wherein (A) is a compound of formula I in which R is hydrogen or methyl.

20. A combination according to claim 17, wherein the ratio of (A):(B) is from 10:1 to 1:10.

21. A combination according to claim 17, wherein the ratio of (A):(B) is from 2:1 to 1:2.

22. A method of stabilizing organic polymers, which comprises incorporating therein a combination as claimed in claim 1.

23. A method according to claim 22, wherein the organic polymers are polyolefins.

24. An organic polymer stabilized with a combination as claimed in claim 1.

25. An organic polymer according to claim 24, which contains 0.02 to 5% by weight of a combination as claimed in claim 1.

26. An organic polymer stabilized with a combination as claimed in claim 7.

27. An organic polymer according to claim 26, which contains 0.02 to 5% by weight of a combination as claimed in claim 7.

28. An organic polymer stabilized with a combination as claimed in claim 12.

29. An organic polymer according to claim 28, which contains 0.02 to 5% by weight of a combination as claimed in claim 12.

30. An organic polymer stabilized with a combination as claimed in claim 17.

31. An organic polymer according to claim 30, which contains 0.02 to 5% by weight of a combination as claimed in claim 17.

* * * * *